United States Patent
Chong et al.

(10) Patent No.: US 6,377,674 B1
(45) Date of Patent: *Apr. 23, 2002

(54) METHOD FOR GLOBAL TITLE TRANSLATION PROCESSING

(75) Inventors: Koan S. Chong, East Brunswick; Robert Yaeger Peters, Jr., Middletown; Mark A. Ratcliffe, Oakhurst, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,052

(22) Filed: Dec. 30, 1998

(51) Int. Cl.[7] ............................................... H04M 7/00
(52) U.S. Cl. ............... 379/230; 379/221.04; 379/220.01
(58) Field of Search ....................... 379/220.01, 221.01, 379/221.09, 221.12, 230, 219, 229; 370/254, 255, 256, 257, 258

(56) References Cited

U.S. PATENT DOCUMENTS

| | | | | |
|---|---|---|---|---|
| 5,838,782 A | * | 11/1998 | Lindquist | 370/401 X |
| 5,894,574 A | * | 4/1999 | Whited | 717/1 |
| 5,915,013 A | * | 6/1999 | Mintz et al. | 379/230 |
| 5,983,217 A | * | 11/1999 | Khosravi-Sichani et al. | 707/102 X |
| 6,028,914 A | * | 2/2000 | Lin et al. | 379/133 X |
| 6,052,458 A | * | 4/2000 | Amir-Ebrahimi | 379/207 X |

* cited by examiner

Primary Examiner—Creighton Smith
(74) Attorney, Agent, or Firm—Banner & Witcoff

(57) ABSTRACT

In processing a global title translation request, a segmentation directory performs a directory function based on information found in a services-related portion of a global title translation request, resulting in call parameters that allow the segmentation directory to determine the point code/subsystem number of a service processor needed to complete a call. Without altering a services-related portion of the global title translation request, a modified version of the global title translation request is sent to the service processor. Additionally, the segmentation directory can respond directly to exception and error conditions.

27 Claims, 3 Drawing Sheets

METHOD FOR GLOBAL TITLE TRANSLATION PROCESSING

TECHNICAL FIELD

The present invention relates generally to telecommunications systems and, in particular, to methods for processing global title translation requests within such telecommunications systems.

BACKGROUND OF THE INVENTION

Telecommunications systems are well known in the art. A typical prior art telecommunications system 100, illustrated in FIG. 1, comprises telephones 102–103 coupled to switches 105–106. Communication paths used to convey user information, such as voice or data, are shown as solid lines between the telephones 102–103 and switches 105–106. Additionally, the system 100 also comprises a signaling network comprising Signal Transfer Points (STPs) 108–109, Service Control Points (SCPs; hereinafter alternatively referred to as "service processors") 111–112, and a segmentation directory (SD) 114. Communication paths used to convey signaling information are shown as dotted lines between the STPs 108–109, SCPs 111–112 and SD 114. In the United States, these signaling links typically operate in accordance with the well-known Signaling System No. 7 (SS7) standard. For the purposes of clarity, less than all of the possible links between the system's components are shown in FIG. 1. Because the telephones 102–103, switches 105–106, STPs 108–109 and SCPs 111–112 are well know in the art, their operation will not be discussed in further detail here. The segmentation directory 114 is described in further detail in U.S. Pat. No. 5,473,677 issued to D'Amato et al. and entitled TELECOMMUNICATIONS NETWORK ARCHITECTURE AND SYSTEM, the teachings of which patent are hereby incorporated by this reference. Generally, the segmentation directory allows for centralized processing of signaling messages and determination of services for a given call.

Within an SS7 network of the type described above, there are basically two different ways for routing a signal. First, the routing can be based on a combination of a point code (PC) and a subsystem number (SSN, hereinafter collectively referred to as a PC/SSN). When a PC/SSN is provided for a signal, each participating node (e.g., switches, STPs, SCPs, etc.) within the serving network must have data identifying the specified PC/SSN. Therefore, whenever a signal is received with a particular PC/SSN, each transferring node within the serving network knows exactly where to send the signal.

As an alternative, signals can also be routed using global title numbers. When the node originating a signal (e.g., a switch) does not know the PC/SSN associated with the destination node (e.g., a service processor), a global title number has to be used for routing purposes. Examples of global titles are toll-free 800/888 numbers and calling card numbers. Simply stated, each transfer node connecting the originating node with the destination node only knows to forward the received signal with a particular global title number toward a certain network or direction. At some point, a correct PC/SSN has to be provided so the signal can reach its final destination. This function is known as global title translation and is usually performed by an STP adjacent to the destination node. Thus, all of the STPs within a given network must include up-to-date information correlating global title numbers with specific PC/SSN information. While this method is currently acceptable, it becomes burdensome in light of the need to simplify the deployment of new services. That is, each time a new service is provisioned in the system or whenever new subscribers to existing services are added, the affected SCPs must be updated, the switch must be updated to request a new global title translation, and STPs must be updated to perform such a translation. Therefore, a need exists for a technique that provides current global title translation functionality and that simplifies service provisioning. In particular, it would be advantageous to use the centralized processing capabilities of segmentation directories to implement global title translation processing.

SUMMARY OF THE INVENTION

The present invention provides a technique for processing global title translation requests in a telecommunications system. Operating within a signaling network forming a portion of the telecommunications system, a segmentation directory completes global title translation by first performing a directory function based on information found in a services-related portion of a global title translation request. The segmentation directory of the present invention includes address information for substantially all customers subscribing to services in the system. The directory function results in call parameters that allow the segmentation directory to determine the point code/subsystem number of a service processor needed to complete the call. Modifying a transport-related portion of the global title translation request to correspond to the service processor previously identified, a modified version of the global title translation request is sent to the service processor. From the viewpoint of a switch that originated the global title translation request, it appears that normal global title routing has been used to address the service processor. However, because the segmentation directory can ascertain all of the necessary information to process the global title translation, the need for STP processing of the global title is eliminated. As a result, service provisioning is simplified because only a relatively small number of segmentation directories and/or service processors require updates, rather than a larger number of STPs and switches. The segmentation directory is also capable of handling exception and error conditions, thus simplifying overall system operation.

DETAILED DESCRIPTION OF THE PREFERRED EMBODIMENT

Figure 1:
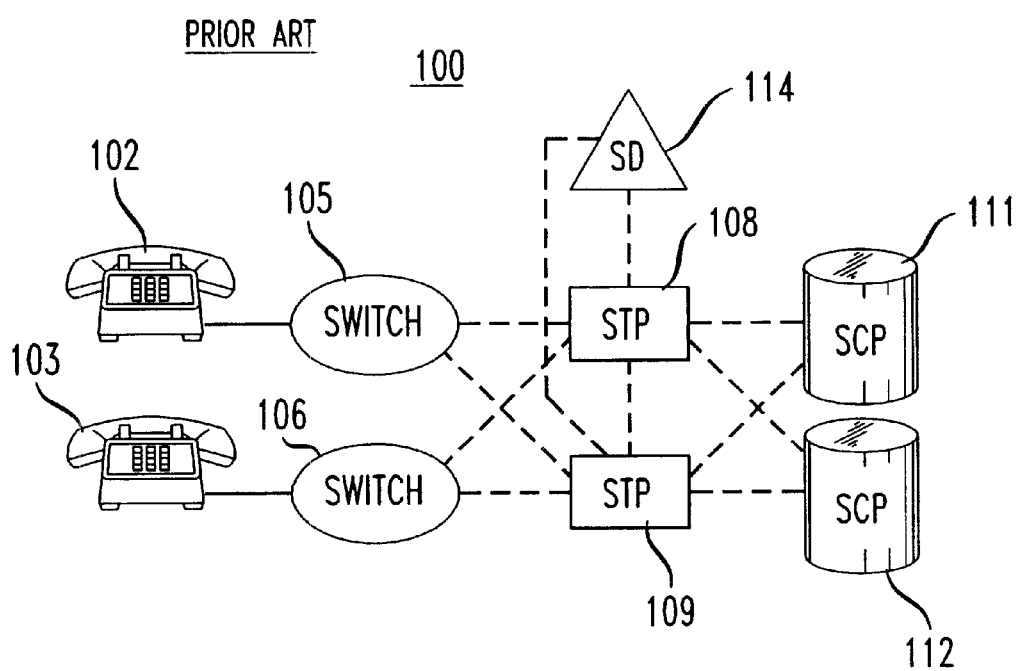
FIG. 1 is a block diagram of a telecommunications system in accordance with prior art techniques.
Figure 2:
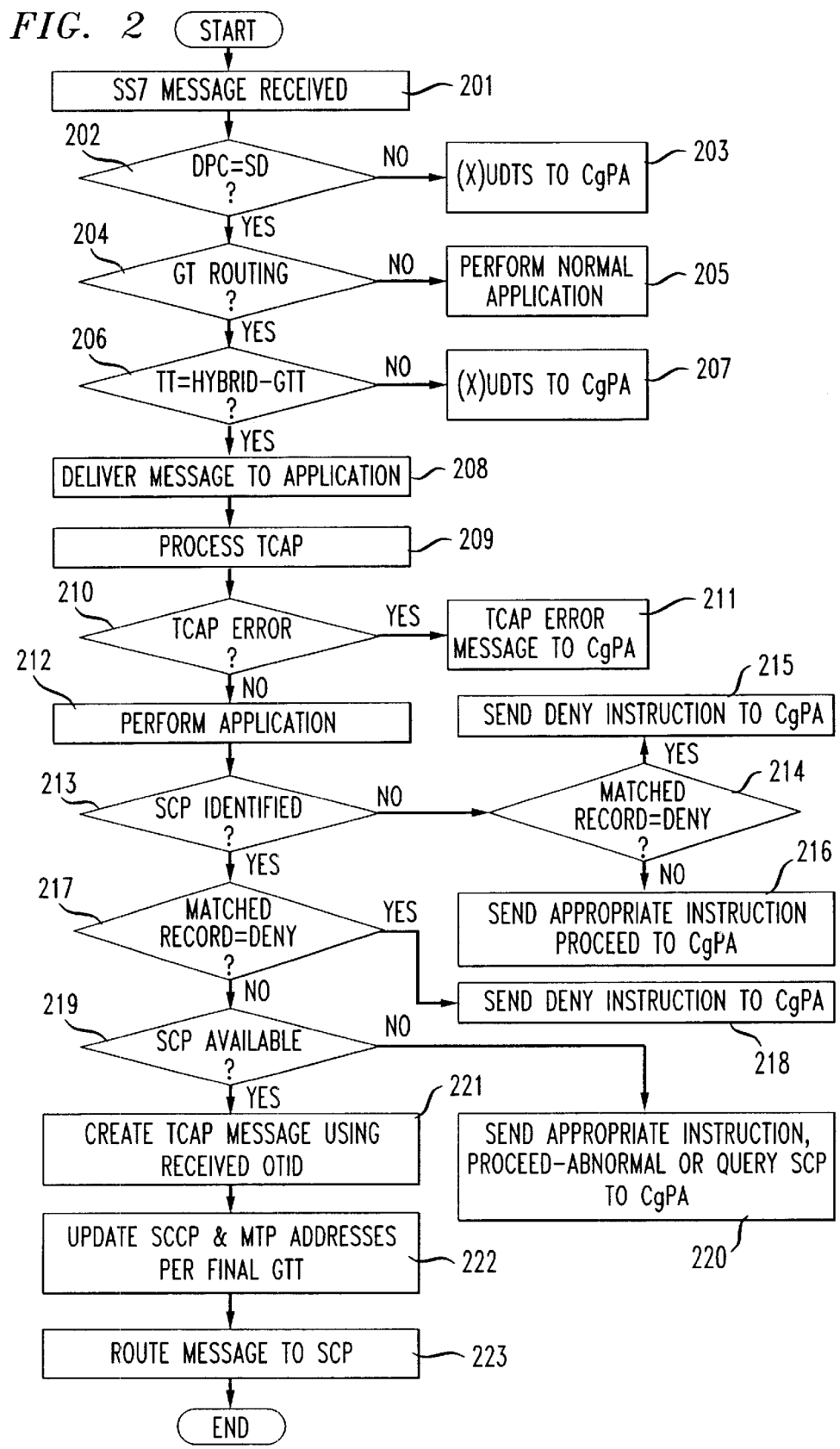
FIG. 2 is flowchart of a method for processing global title translation requests in accordance with the present invention.

The present invention may be more fully described with reference to FIGS. 2 and 3. FIG. 2 illustrates a method whereby a segmentation directory processes a global title translation (GTT) request in accordance with the present invention. Preferably, the method illustrated in FIG. 2 is implemented as a combination of hardware interfaces and stored software routines executing on a suitable microprocessor-based platform, such as that described in U.S. Pat. No. 5,473,677. At step 201, the segmentation directory receives a message, preferably in the form of an SS7 message. In one embodiment, the SS7 message is an Advanced Intelligent Network (AIN) query originated by a switch (such as an Lucent, Inc. "5ESS" switch) in response to a call initiated by a telephone coupled to the switch. As known in the art, SS7 messages generally comprise a protocol "stack" that maps loosely to the Open Systems Interconnect (OSI) seven-layer model. In particular, the SS7 protocol stack comprises the following functional abstractions: a Message Transfer Part (MTP) that is further subdivided into three different levels and encompasses functionality required for reliable transmissions over the physical medium and message routing; a Signaling Connection Control Part (SCCP) that provides reliable connectionless and connection-oriented transfer of data between endpoints; and a Transactions Capabilities Applications Part (TCAP) that supports the exchange of non-circuit related data between application services. In general terms, a service-related portion of a message refers to that part of a message that provides the exchange of non-circuit related data between application services. Likewise, a transport-related portion of a message refers to that part of a message that provides reliable connectionless and connection-oriented transfer of data between endpoints.

At step 202, it is determined whether the message received at step 201 is properly addressed to the segmentation directory. That is, the destination point code (DPC) included in the message (within the MTP layer) is compared with the segmentation directory's point code; if they match, the message is was correctly sent to the segmentation directory. If they do not match, an error message is sent to the calling party address (CgPA); in the example of FIG. 2, a (extended) unitdata service message (X)UDTS, as known in the art, is sent at step 203 to the switch that originated the message.

At step 204, the segmentation directory determines whether the received message is global title routed or PC/SSN routed. If the message is PC/SSN routed, there is no need to perform global title translation, and processing continues at step 205 where normal segmentation directory processing, such as that described in U.S. Pat. No. 5,473,677, is performed. If the message is global title routed, the segmentation directory determines at step 206 whether the global title translation is to be performed by the segmentation directory. In one embodiment, this done by inspecting a translation type (TT) field within the SCCP layer of the received message. The present invention anticipates that a specific translation type identifying a "hybrid" global title translation can be defined. The hybrid GTT translation type indicates that the segmentation directory is to perform title translation. If the translation type does not indicate the need for a hybrid GTT, then the segmentation directory sends an error message to the calling party; again, this is shown in FIG. 2 as an (X)UDTS sent to the switch at step 207.

If the proper translation type is received by the segmentation directory, processing proceeds to step 208 where the received message, hereinafter referred to as the global title translation request, is delivered to a directory function application within the segmentation directory. The directory function application first processes the received services-related portion of the global title translation request (the TCAP in the case of SS7) at step 209 and, at step 210, it is determined whether any errors resulted from this processing. Such errors may include message formation errors, missing mandatory parameters, missing or incorrect information in parameters (e.g., not enough digits in a dialed number parameter), etc. If an error is found in the received services-related portion of the global title translation request, an error message is sent to the calling party, i.e., the switch, at step 211. This error message indicates the type of error that was detected, as known in the art. The switch, in turn, determines if it should "kill" the call or continue with call processing based on the type of error indicated.

If there are no errors in the received services-related portion of the global title translation request, then the directory function is executed at step 212. Currently, segmentation directories identify service processors based on various call parameters provided to the segmentation directory via the TCAP layer of an "SDQuery" message or global title translation request. Such call parameters include Automatic Number Identification (ANI) information, dialed number (DN) information, bearer capability, charge number, charge party station type, calling party number, carrier, user identifications, etc. as known in the art. Furthermore, it is anticipated that additional call parameters can be created as the needs of the network evolve. Based on these call parameters or their equivalents, current segmentation directories access memory to determine whether a service processor is required to complete a given call. In contrast, step 212 requires that the segmentation directory inspect the received services-related portion of the global title translation request to derive the call parameters or their equivalents. Step 212 also differs from prior art techniques for processing received GTT requests in that STPs used to process such requests do not inspect the services-related portion of the received message as an interim step in determining the identification of the service processor. Where the received services-related portion of the global title translation request is a TCAP, the segmentation directory of the present invention extracts the required call parameters from the TCAP. Once call parameters are obtained, the normal directory function is performed wherein the segmentation directory attempts to identify a service processor. It is important to note that step 212 does not alter the received services-related portion of the global title translation request when extracting the required call parameters.

If a service processor is not identified, as determined at step 213, it is determined at step 214 whether the call should be denied outright, e.g., when a party requesting the service is not entitled to use the requested service. If the call is to be denied, a message comprising a "Deny" instruction is sent by the segmentation directory to the calling party address at step 215. As a result of the Deny instruction, e.g., an AIN TCAP SendToResource message, the switch will play an announcement and disconnects the call. If the call is not to be denied, the segmentation directory sends a message to the switch at step 216. This message instructs the switch to proceed with the call based on the information that it already has or to deny the call by playing an announcement and disconnecting the call. Thus, the switch will use the information it has to attempt to route the call, determine the next trunk group to the next switch or line to the destination subscriber. It will also generate the appropriate billing and call records for the call.

If a service processor is identified by the segmentation directory, the corresponding records for the identified service processor are searched at step 217 to determine whether the call should be denied outright, e.g., when a party requesting the service is not entitled to use the requested service. If the call is to be denied, a message comprising a "Deny" instruction, e.g., an AIN TCAP SendToResource message, is sent by the segmentation directory to the calling party address at step 218. As a result of the Deny instruction, the switch plays an announcement and disconnects the call.

If a service processor is identified by the segmentation directory and no indication is found that the call should be denied, it is next determined whether the identified service processor is available at step 219. In the context of the present invention, a service processor is not available when communications with the service processor are not possible, when the service processor is not operating or if the service processor's application is in overload. Techniques for determining either of these conditions and, in some instances, the reasons for these conditions are well known in the art. Communications are not possible typically due to link failure or some other reason that makes the service processor inaccessible via MTP routing. Alternatively, communications may be possible, but a condition at the service processor (e.g., a failure condition at the service processor, manual overload control of the service processor, a subsystem prohibition at the service processor or some other similar condition) renders it functionally inoperable. If communications with the service processor are not currently possible, then a message is sent to the switch at step 220 instructing the switch to query the service processor directly. In this case, the message sent to the switch includes, at a minimum, service processor identification information that uniquely identifies at least one service processor. In an SS7 system, the service processor identification information comprises at least one PC/SSN combination needed to address a service processor, as determined by the segmentation directory at steps 212–213. Furthermore, service-specific information can also be sent to the switch. Service-specific information is generally information that the service processor uses to determine the proper handling of a requested service. Examples of service-specific information include precedence information used to determine the order in which services are to be provided and customer identifications. Based on the message, the service processor identification information and, optionally, the service-specific information, the switch itself can formulate and send a query to the service processor. The query referred to at step 220 can be currently accomplished in one of two manners. In the first, the segmentation directory explicitly instructs the switch to query the service processor from the switch's point in call (PIC) using the PC/SSN combination discussed above as the MTP and SCCP destination addresses. In the second, the switch is instructed to restart at that PIC at which the original query, received by the segmentation directory, was sent using the PC/SSN combination discussed above as the MTP and SCCP destination addresses, and any customer specific information determined.

If it is determined at step 219 that the service processor is not available because it is not operating, a message, e.g., an AIN TCAP AnalyzeRoute or Continue message, instructing the switch to proceed due to an abnormal condition is transmitted to the switch at step 220. In this instance, however, the segmentation directory also informs the switch that the service processor is not currently operating and the reasons why the service processor is not currently operating. Based on the message and the information regarding service processor inoperability, the switch can attempt to default route the call, generate a default billing record and record the reason, based on the information provided by the segmentation directory, why the call was default routed.

Assuming that a service processor has been identified, and that it is available, the process continues at step 221 where the segmentation processor creates a modified version of the received global title translation request in which it is careful to preserve the received services-related portion of the global title translation request. In terms of SS7 signaling, the segmentation directory creates the modified version of the GTT request by reproducing the originating transaction identification (OTID) from the received TCAP in the TCAP of the modified version of the GTT request.

At step 222, the segmentation directory updates the SCCP and MTP addresses of the modified version of the GTT request according to the results of the GTT. This is described in further detail below relative to FIG. 3. The segmentation directory also includes a customer identification in the modified version of the GTT request. In one embodiment, this is done by appending the customer identification to the TCAP in an Extension Parameter. Additionally, the service-specific information, discussed above, can also be appended to the TCAP for transmission to the service processor.

Finally, at step 223, the segmentation directory sends the modified version of the global title translation request to the service processor. By preserving the received services-related portion of the global title translation request for future transmission to the identified service processor, the segmentation directory of the present invention appears transparent to the originating switch. Furthermore, because there are a relatively fewer number of segmentation directories than STPs in a given system, service provisioning, as it relates to global title translations, is simplified and less error prone because a lesser number of network nodes will require updates.

Figure 3:
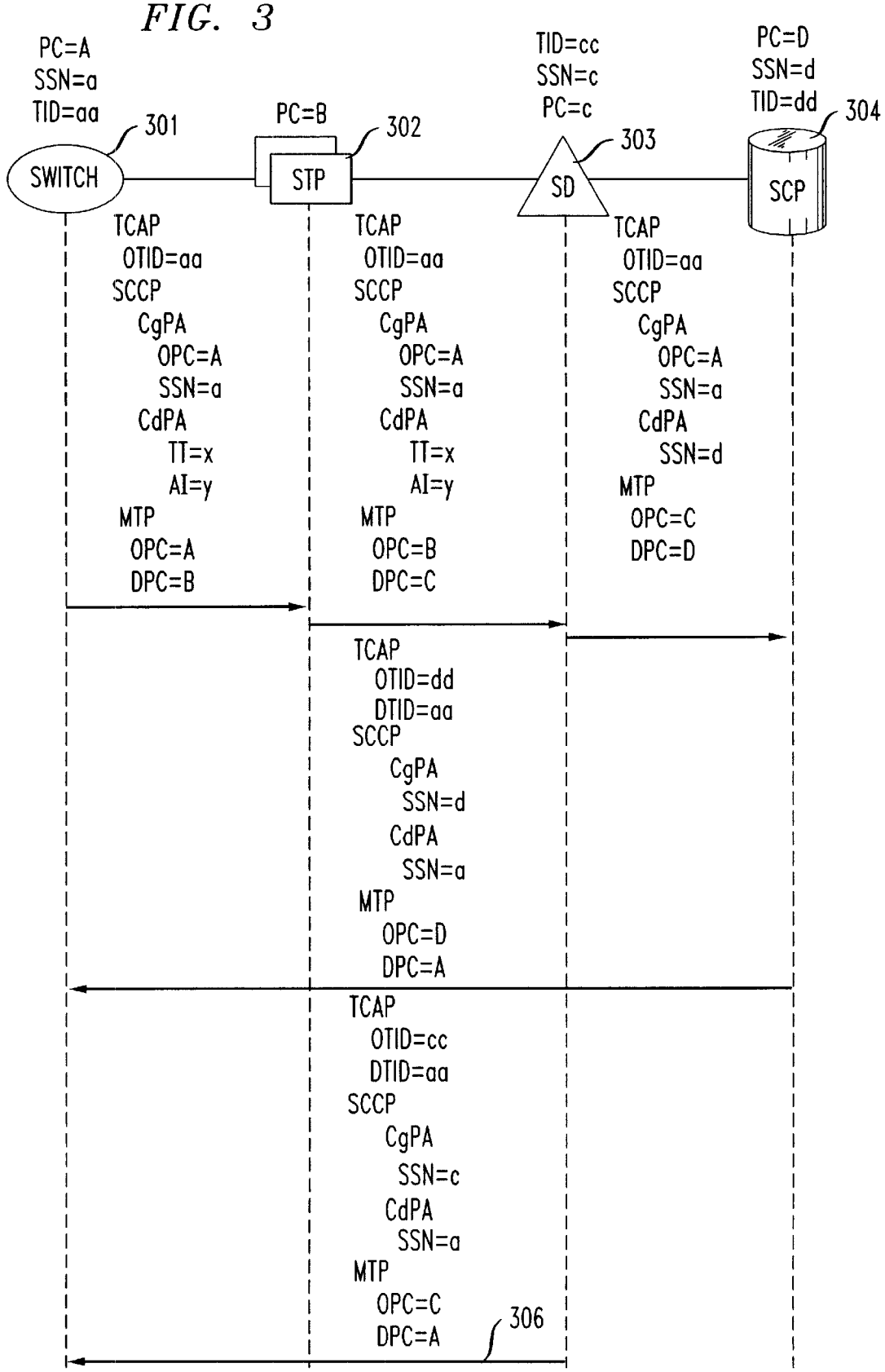
FIG. 3 illustrates signaling messages conveyed between nodes of a telecommunications system operating in accordance with the present invention.

An example of the above-described process is illustrated in FIG. 3. In particular, FIG. 3 shows a teleconumunications system comprising a switch 301, an STP 302, a segmentation directory 303 and a service processor 304. Although a direct link is shown between the segmentation directory 303 and the service processor 304, the connection between such devices is typically a logical one, with the actual physical connection running through one or more STPs. As shown, the switch 301 is identified by the point code "A". It is further assumed that a call has been initiated and the subsystem number and originating transaction identification corresponding to the call are "a" and "aa", respectively. The STP 302 is identified by the point code "B". Although a single STP is shown in FIG. 3, it is not uncommon for a signaling message to be routed through multiple STPs. The segmentation directory 303 is identified by the point code "C", and it is assumed that the subsystem number and originating transaction identification corresponding to the call are "c" and "cc", respectively. Finally, the service processor 304 is identified by the point code "D", and it is assumed that the subsystem number relevant to the call is "d".

The progression of time is represented in FIG. 3 from top to bottom. Thus, a message is initially sent from the switch 301 to its associated STP 302. Formulating an AIN TCAP message, the switch includes the OTID "aa" in the TCAP, and populates the calling party address of the SCCP with its point code "A" and subsystem number "a". The switch 301 puts the translation type "x" in the called party address of the SCCP to indicate that it is requesting a hybrid global title translation. In order to properly route the message, the switch 301 uses the STP's point code "B" as the destination point code and its own point code "A" as the originating point code.

Upon receiving the message, the STP 302 recognizes that the message is for a hybrid global title translation based on the translation type included in the called party address. As such, the STP 302 substitutes its own point code "B" as the originating point code and sets the destination point code to the segmentation directory's point code "C". The segmentation directory 303, upon receiving the message, recognizes the message a request for global title translation based on the translation type "x". As described above, the segmentation directory 303 performs its directory function based on call parameters (not shown) extracted from the TCAP and identifies the service processor 304. Without altering the TCAP portion of the message, the segmentation directory populates the called party address with the service processor's subsystem number "d" and the destination point code with the service processor's point code "D". The segmentation directory 303 then sends the modified message to the service processor 304. In this manner, the segmentation directory has performed the global title translation in a manner transparent to the switch 301.

The service processor 304, upon receiving the modified message, determines the proper treatment for the call based on the received TCAP instruction, parameters, a customer identification and, optionally, service-specific information appended to the TCAP. Because the SCCP calling party address refers to the switch 301, the service processor 304 can formulate a response to be sent directly to the switch 301. As shown, the response includes an originating transaction identification "dd" corresponding to the service processor 304 and a destination transaction identification "aa" corresponding to the switch 301. Likewise, the originating and destination PC/SSN combinations refer to the service processor 304 and switch 301, respectively.

Those instances in which the segmentation directory 303 responds directly to the switch 301 are also illustrated in FIG. 3. In particular, a message 306 is shown in which the TCAP services-related portion comprises the Proceed, Proceed-Abnormal, Deny or Query messages discussed above. As shown, the message 306 includes an originating transaction identification "cc" corresponding to the segmentation directory 303 and a destination transaction identification "aa" corresponding to the switch 301. Likewise, the originating and destination PC/SSN combinations refer to the segmentation directory 303 and switch 301, respectively.

What has been described is merely illustrative of the application of the principles of the present invention. Other arrangements and methods can be implemented by those skilled in the art without departing from the spirit and scope of the present invention.

What is claimed is:

1. A method for processing a global title translation request, the method comprising steps of:
   receiving the global title translation request;
   directly accessing a received services-related portion of the global title translation request to ascertain call parameters; and
   identifying a service processor needed to process the global title translation request based on the call parameters.

2. The method of claim 1, wherein the received services-related portion comprises a received Transaction Capabilities Application Part of the global title translation request.

3. The method of claim 1, wherein the call parameters comprise at least one of a dialed number and Automatic Number Identification information.

4. The method of claim 1, further comprising a step of:
   transmitting, to the service processor, a modified version of the global title translation request, wherein the received services-related portion remains unchanged, and wherein a transport-related portion of the modified version of the global title translation request corresponds to the service processor.

5. The method of claim 4, wherein the transport-related portion comprises a Signal Connection Control Part of the modified version of the global title translation request.

6. The method of claim 4, wherein the step of transmitting further comprises a step of:
   transmitting a customer identification to the service processor.

7. The method of claim 6, wherein the customer identification is appended to the unchanged received services-related portion of the modified version of the global title translation request.

8. The method of claim 6, wherein the step of transmitting further comprises a step of:
   transmitting service-specific information to the service processor.

9. In a telecommunications system comprising a switch in communication with a segmentation directory, a method for a segmentation directory to process a global title translation request, the method comprising steps of:
   receiving, at the segmentation directory, a global title translation request originated by the switch;
   directly accessing, by the segmentation directory, a received services-related portion of the global title translation request to ascertain call parameters; and
   determining, based on the call parameters, whether a service processor needed to process the global title translation request is identified in memory of the segmentation directory.

10. The method of claim 9, further comprising a step of:
    when the service processor is identified in the memory of the segmentation directory, transmitting, by the segmentation directory to the service processor, a modified version of the global title translation request, wherein the received services-related portion remains unchanged, and wherein a transport-related portion of the modified version of the global title translation request corresponds to the service processor.

11. The method of claim 9, further comprising a step of:
    when the service processor is not identified in the memory of the segmentation directory, transmitting, by the segmentation directory to the switch, a message instructing the switch to proceed with a call corresponding to the global title translation request based on information that the switch currently possesses.

12. The method of claim 9, further comprising a step of:
    when the service processor is identified in the memory of the segmentation directory but communication with the service processor is not currently possible, transmitting by the segmentation directory to the switch, a message that includes service processor identification information, wherein the message instructs the switch to query the service processor directly based on the service processor identification information.

13. The method of claim 12, further comprising a step of:
    when the service processor is identified in the memory of the segmentation directory but communication with the service processor is not currently possible, transmitting by the segmentation directory to the switch, the message that includes service processor identification information and service-specific information, wherein the message instructs the switch to query the service processor directly based on the service processor identification information and the service-specific information.

14. The method of claim 9, further comprising a step of:
    when the service processor is identified in the memory of the segmentation directory but the service processor is not currently operating, transmitting by the segmentation directory to the switch, a message that instructs the service processor to proceed with a call corresponding to the global title translation request based on information that the switch currently possesses, wherein the message includes information indicating that the service processor is not operating and reasons why the service processor is not operating.

15. The method of claim 9, further comprising steps of:

determining, by the segmentation directory, that the global title translation request should be denied; and transmitting, by the segmentation directory to the switch, a message that instructs the switch to discontinue a call corresponding to the global title translation request.

16. In a telecommunications system comprising a switch in communication with a segmentation directory, a method for processing a global title translation request, the method comprising steps of:

receiving, at the segmentation directory, a global title translation request originated by the switch;

accessing, by the segmentation directory, a received Transaction Capabilities Application Part of the global title translation request to ascertain call parameters;

determining, based on the call parameters, whether a service processor needed to process the global title translation request is identified in memory of the segmentation directory; and when the service processor is identified in the memory of the segmentation directory, transmitting, by the segmentation directory to the service processor, a modified version of the global title translation request, wherein the received Transaction Capabilities Application Part remains unchanged, and wherein a Signaling Connection Control Part of the modified version of the global title translation request corresponds to the service processor.

17. The method of claim 16, wherein the call parameters comprise at least one of a dialed number and Automatic Number Identification information.

18. The method of claim 16, wherein the step of transmitting further comprises a step of:

transmitting, by the segmentation directory to the service processor, a customer identification.

19. The method of claim 18, wherein the customer identification is appended to the unchanged received Transaction Capabilities Application Part of the modified version of the global title translation request.

20. The method of claim 18, wherein the step of transmitting further comprises a step of:

transmitting, by the segmentation directory to the service processor, service-specific information.

21. The method of claim 16, further comprising a step of:

when the service processor is not identified in the memory of the segmentation directory, transmitting, by the segmentation directory to the switch, a message instructing the switch to proceed with a call corresponding to the global title translation request based on information that the switch currently possesses.

22. The method of claim 16, further comprising a step of:

when the service processor is identified in the memory of the segmentation directory but communication with the service processor is not currently possible, transmitting by the segmentation directory to the switch, a message that includes service processor identification information, wherein the message instructs the switch to query the service processor directly based on the service processor identification information.

23. The method of claim 22, further comprising a step of:

when the service processor is identified in the memory of the segmentation directory but communication with the service processor is not currently possible, transmitting by the segmentation directory to the switch, the message that includes service processor identification information and service-specific information, wherein the message instructs the switch to query the service processor directly based on the service processor identification information and the service-specific information.

24. The method of claim 16, further comprising a step of:

when the service processor is identified in the memory of the segmentation directory but the service processor is not currently operating, transmitting by the segmentation directory to the switch, a message that instructs the service processor to proceed with a call corresponding to the global title translation request based on information that the switch currently possesses, wherein the message includes information indicating that the service processor is not operating and reasons why the service processor is not operating.

25. The method of claim 16, further comprising steps of:

determining, by the segmentation directory, that the global title translation request should be denied; and transmitting, by the segmentation directory to the switch, a message that instructs the switch to discontinue a call corresponding to the global title translation request.

26. The method of claim 16, further comprising a step of:

when a translation type included in the global title translation request is not an allowed translation type, transmitting by the segmentation directory to the switch, an error message.

27. The method of claim 16, further comprising a step of:

when the received Transaction Capabilities Application Part includes errors, transmitting by the segmentation directory to the switch, an error message.

* * * * *